United States Patent
Moriyoshi

(10) Patent No.: US 11,561,361 B2
(45) Date of Patent: Jan. 24, 2023

(54) OPTICAL APPARATUS

(71) Applicant: CANON KABUSHIKI KAISHA, Tokyo (JP)

(72) Inventor: Akino Moriyoshi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 16/880,213

(22) Filed: May 21, 2020

(65) Prior Publication Data

US 2020/0379204 A1  Dec. 3, 2020

(30) Foreign Application Priority Data

May 28, 2019  (JP) .............................. JP2019-099349

(51) Int. Cl.
  *G02B 7/02*  (2021.01)
  *G02B 23/18*  (2006.01)
  *G02B 7/06*  (2021.01)

(52) U.S. Cl.
  CPC ............. *G02B 7/022* (2013.01); *G02B 7/021* (2013.01); *G02B 7/06* (2013.01); *G02B 23/18* (2013.01)

(58) Field of Classification Search
  CPC ... G02B 7/04; G02B 7/06; G02B 7/12; G02B 7/021; G02B 7/022; G02B 21/20; G02B 23/18; G02B 25/004; G02B 2027/0132
  See application file for complete search history.

(56) References Cited

U.S. PATENT DOCUMENTS

| | | | | |
|---|---|---|---|---|
| 6,008,937 A * | 12/1999 | Yano | ...................... | G02B 23/18 359/407 |
| 6,307,673 B1 | 10/2001 | Hirunuma | | |
| 6,735,385 B2 | 5/2004 | Abe | | |
| 6,909,545 B2 * | 6/2005 | Takano | ..................... | G02B 7/12 359/557 |
| 8,422,129 B2 * | 4/2013 | Noguchi | .................. | G02B 7/06 359/407 |
| 2005/0174633 A1 * | 8/2005 | Nemoto | .................... | G02B 7/12 359/410 |
| 2005/0237609 A1 * | 10/2005 | Nemoto | ................... | G02B 7/06 359/410 |
| 2010/0053750 A1 * | 3/2010 | Noguchi | .................. | G02B 7/06 359/480 |
| 2016/0305464 A1 * | 10/2016 | Balderrama | .......... | F16B 31/021 |

FOREIGN PATENT DOCUMENTS

| | | |
|---|---|---|
| JP | 2001133699 A | 5/2001 |
| JP | 2003107366 A | 4/2003 |
| JP | 4054405 B2 | 2/2008 |
| JP | 2018005128 A | 1/2018 |

* cited by examiner

*Primary Examiner* — Ephrem Z Mebrahtu
(74) *Attorney, Agent, or Firm* — Rossi, Kimms & McDowell LLP

(57) ABSTRACT

An optical apparatus having a pair of lenses spaced from each other in a first direction and movable in a second direction orthogonal to the first direction includes a movable member configured to hold the pair of lenses and to move in a second direction together with a female thread member, and a guide configured to guide a movement of the movable member in the second direction relative to the base member, where a first plane includes an optical axis of each of the pair of lenses, the guide being located at a position on or along a second plane that is orthogonal to the first plane and includes a central axis of the male thread member.

8 Claims, 5 Drawing Sheets

OPTICAL APPARATUS

BACKGROUND OF THE INVENTION

Field of the Invention

The present invention relates to an optical apparatus having a pair of lenses, such as binoculars.

Description of the Related Art

The above optical apparatus includes a mechanism for integrally hold a pair of left and right lenses by a movable member so as to eliminate a moving amount difference between the pair of lenses in moving the pair of lenses in the optical axis direction during focusing or the like, and for moving the movable member by rotating a screw member. As disclosed in Japanese Patent No. 4054405, this mechanism includes, in front (or on the object side) of the screw member, a plurality of linear guides that are spaced from each other in the optical axis direction and guides the movable member in the optical axis direction with few plays or backlashes in the lateral direction.

However, the plurality of linear guides spaced from each other in the optical axis direction have difficulties in making compact the optical apparatus in the optical axis direction.

SUMMARY OF THE INVENTION

The present invention provides a compact optical apparatus that can stably guide a movable member that holds a pair of lenses in an optical axis direction.

An optical apparatus according to one aspect of the present invention having a pair of lenses spaced from each other in a first direction and movable in a second direction orthogonal to the first direction includes a base member, a male thread member rotatable at a fixed position in the second direction, a rotationally operated member rotationally operated by a user and configured to rotate the male thread member, a female thread member engaged with the male thread member and configured to move in the second direction relative to the base member as the male thread member is rotated, a movable member configured to hold the pair of lenses and to move in the second direction together with the female thread member, and a guide configured to guide the movement of a movable member in the second direction relative to the base member, where a first plane includes an optical axis of each of the pair of lenses, the guide being located at a position on or along a second plane that is orthogonal to the first plane and includes a central axis of the male thread member.

An optical apparatus according to another aspect of the present invention having a pair of lenses spaced from each other in a first direction and movable in a second direction orthogonal to the first direction includes a base member, a male thread member rotatable at a fixed position in the second direction, a rotationally operated member rotationally operated by a user and configured to rotate the male thread member, a female thread member engaged with the male thread member and configured to move in the second direction relative to the base member as the male thread member is rotated, and a movable member configured to hold the pair of lenses and to move in the second direction together with the female thread member. The male thread member and the female thread member have thread pitches different from each other, and thereby guide the movement of the movable member in the second direction.

Further features of the present invention will become apparent from the following description of exemplary embodiments with reference to the attached drawings.

DESCRIPTION OF THE EMBODIMENTS

Figure 1:
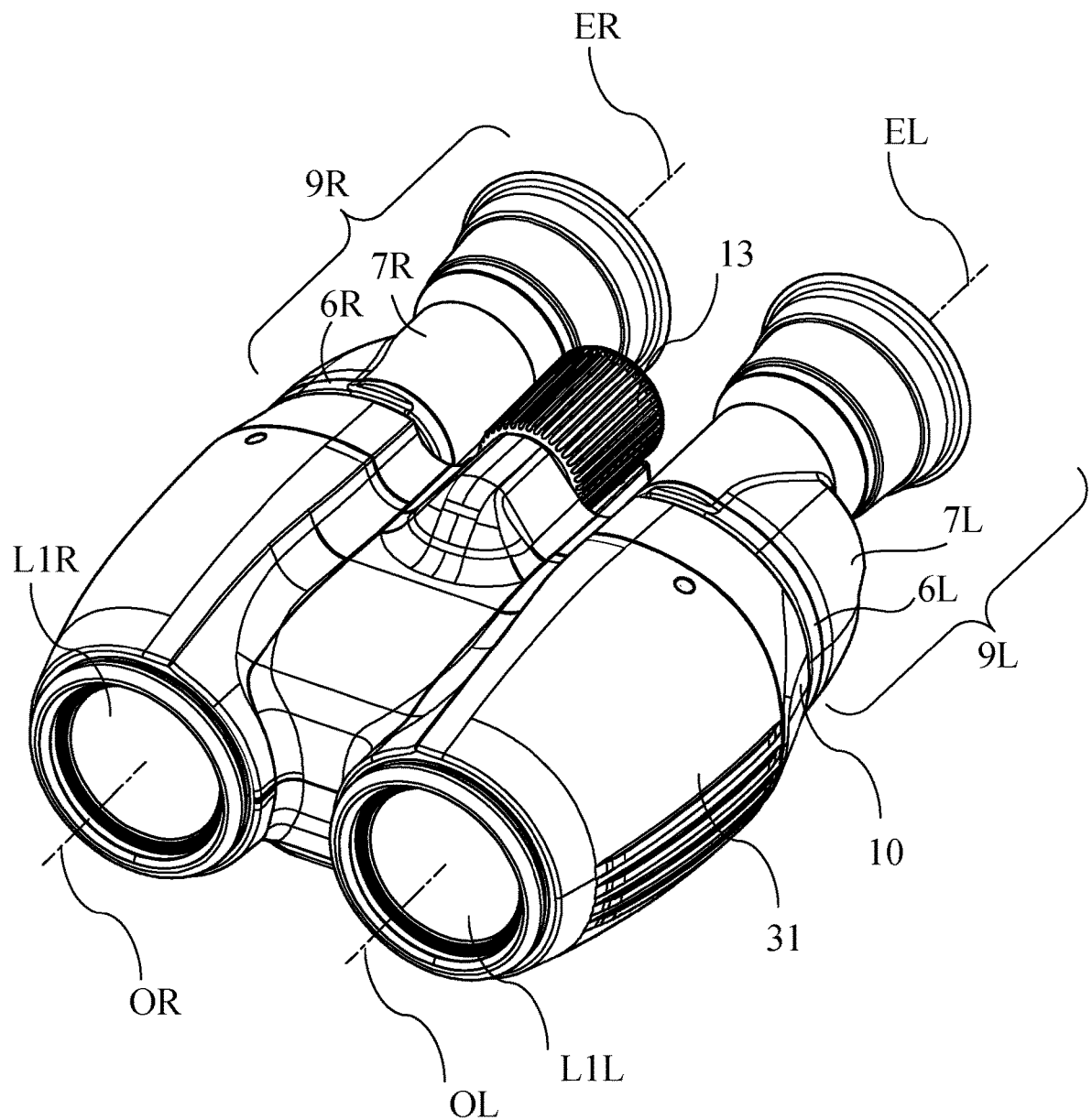
FIG. 1 is a perspective view showing an external appearance of binoculars (optical apparatus) according to one embodiment of the present invention.

Referring now to the accompanying drawings, a description will be given of embodiments according to the present invention. FIG. 1 illustrates an external appearance of binoculars serving as an optical apparatus according to one embodiment of the present invention. The binoculars include a pair of left and right objective optical systems, a pair of right and left erecting optical systems, and a pair of left and right eyepiece optical systems. The left and right in this embodiment respectively correspond to the left eye and the right eye observing the binoculars. In this embodiment, an object side observed by the binoculars will be also referred to as a front side, and an observer (user) side will be also referred to as a rear side.

In FIG. 1, an optical axis OL of the left objective optical system and an optical axis OR of the right objective optical system are parallel to each other. In FIG. 1, a distance between the optical axis OL and the optical axis OR is the same as a distance between the optical axis EL of the left eyepiece optical system and an optical axis ER of the right eyepiece optical system. In the following description, the optical axes OL and OR of the objective optical system will be called objective optical axes, and the optical axes EL and ER of the eyepiece optical system will be called eyepiece optical axes. A direction in which the optical axes OL and OR (EL and ER) are spaced from each other will be referred to as a lateral (left-right) direction (or a first direction), and a direction in which each optical axis extends will be referred to as an optical axis direction (or a second direction). In the direction orthogonal to the optical axis direction and the lateral direction, the upper side of the binoculars in the normal posture as illustrated in FIG. 1 will be referred to as an upper side, and the lower side will be referred to as a lower side.

A front cover 31 houses the left and right objective optical systems, and holds left and right protective glasses L1L and L1R at its front ends. A body 10 is integrated with the front cover 31 by screws (not illustrated), houses a focus mechanism and an interpupillary distance adjusting mechanism described later, and includes left and right eyepiece units 9L and 9R including the erecting optical system and the eyepiece optical system, respectively.

Figure 2:
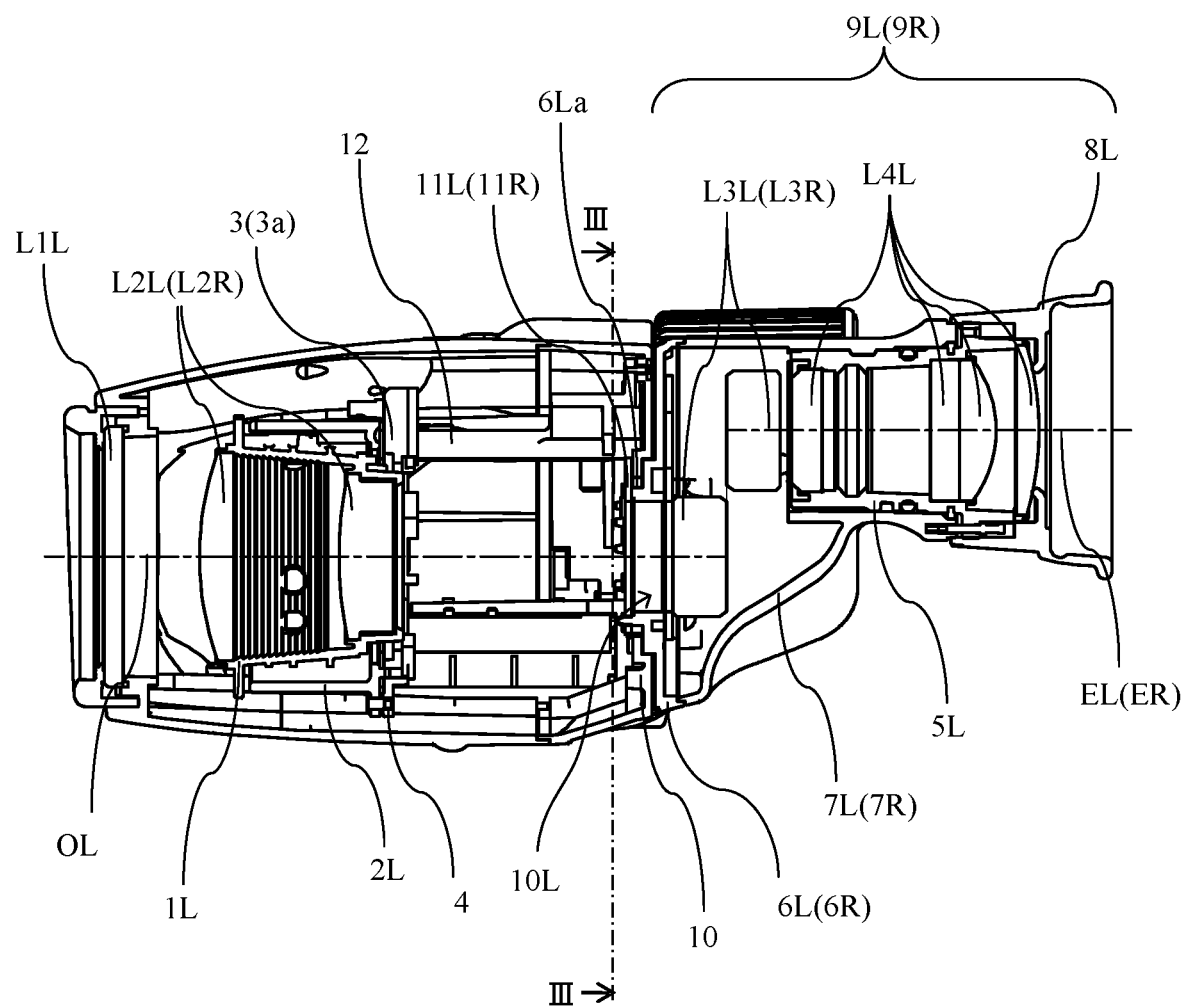
FIG. 2 is a sectional view of the binoculars.

FIG. 2 illustrates an optical configuration and a mechanical structure on the left side when the binoculars in the state illustrated in FIG. 1 are cut along a plane including the objective optical axis OL and the eyepiece optical axis EL. A description will now be given of the left optical configuration and mechanical structure, but the right optical configuration and mechanical structure have the same configuration and structure and some left components with the final letter L have parenthesized final letter R indicating right corresponding components.

The objective optical system has the protective glass L1L and the objective lens L2L. The erecting optical system includes a second type Porr prism L3L. The eyepiece optical system includes an eyepiece L4L.

A front lens barrel 1L holds the objective lens L2L, and is held by a fixed barrel 2L via an eccentric roller (not illustrated). The fixed cylinder 2L is fixed by a screw 4 onto an objective mount surface 3a formed on an objective table 3 orthogonally to the objective optical axis OL. The parallel rotation and eccentricity of the front barrel 1L relative to the fixed barrel 2L are adjusted by the rotation of the eccentric roller so that the objective optical axis OL coincides with the eyepiece optical axis EL via the second type Porr prism L3L.

In an eyepiece unit 9L, an eyepiece barrel 5L holds the eyepiece L4L. A prism holder 6L holds the second type Porr prism L3L. An eyepiece holder 7L holds the eyepiece barrel 5L. The prism holder 6L and the eyepiece holder 7L are integrated by screws so that the second type Porr prism L3L and the eyepiece L4L are arranged in a predetermined positional relationship. The holding mechanism and adjustment mechanism for the second type Porr prism L3L will be described later.

Eye contact rubber 8L is put on the eyepiece barrel 5L. The observer observes the object by putting his/her face on the eye contact rubber 8L. In order to connect the eyepiece barrel 5L and the eyepiece holder 7L, a male helicoid screw is formed on the outer peripheral wall of the eyepiece barrel 5L, and a female helicoid screw is formed on the inner peripheral wall of the eyepiece holder 7L. The diopter can be adjusted by rotating either the left eyepiece barrel 5L or the right eyepiece barrel (not illustrated) around the eyepiece optical axis and by moving it in the optical axis direction.

The body 10 supports the left and right eyepiece units 9L and 9R rotatably around the objective optical axes OL and OR, respectively, and a focusing mechanism that moves the left and right objective lenses L2L and L2R in the optical axis direction for focusing according to the observation distance. The body 10 is made of metal because high rigidity and accuracy are required. The body 10 has an opening 10L coaxial with the left objective optical axis OL and an opening (not illustrated) coaxial with the right objective optical axis OR. A cylindrical portion 6La provided in a left prism holder 6L is rotatably engaged with the left opening 10L, and the cylindrical portion of the left prism holder is similarly rotatably engaged with the right opening.

Figure 3:
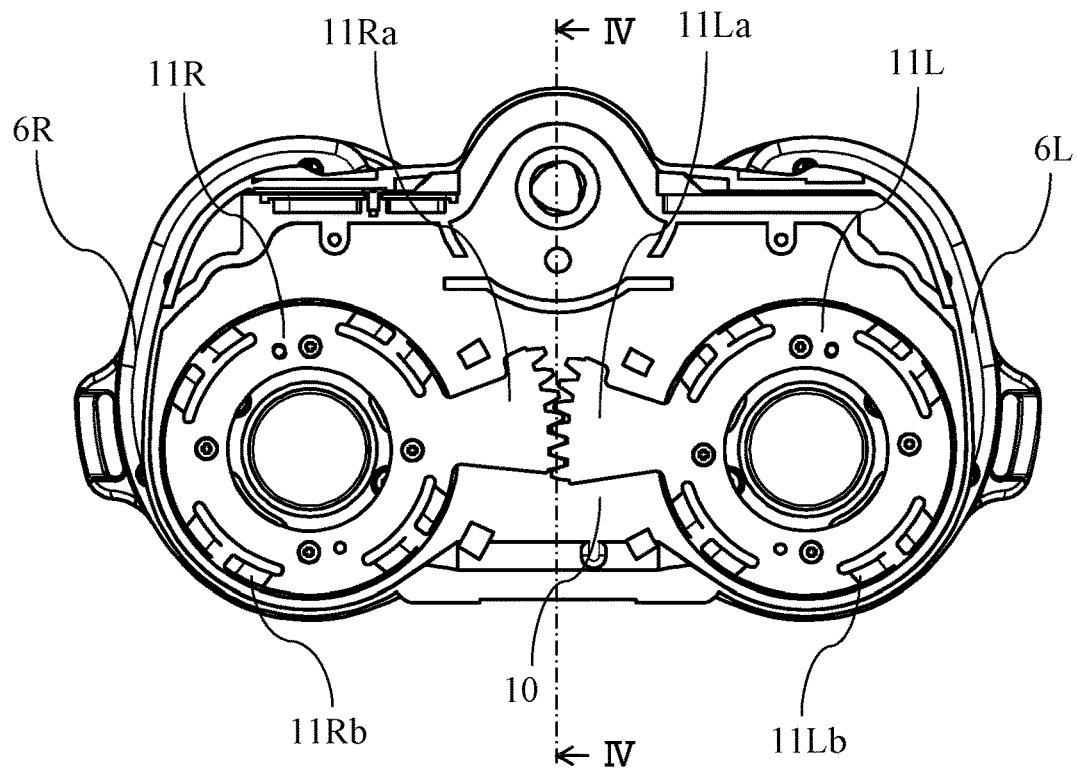
FIG. 3 is a sectional view of the binoculars illustrated in FIG. 2.

FIG. 3 illustrates a section of the binoculars taken along a line in FIG. 2 and an interpupillary distance adjusting mechanism. Left and right interlock plates 11L and 11R are respectively coupled to the peripheries of the cylindrical portions 6La and 6Ra of the prism holders 6L and 6R with screws so that they can rotate integrally with the prism holders 6L and 6R, and include gears 11La and 11Ra for interlocking their rotations. The interlock plates 11L and 11R have a plurality of arms 11Lb and 11Rb, respectively, for generating biasing forces in the optical axis direction. The arms 11Lb and 11Rb sandwich the body 10 and generate the biasing forces to press the prism holders 6L and 6R against the body 10.

The rotations of the left and right eyepiece units 9L (6L, 7L) and 9R (6R, 7R) can be interlocked with each other since the gears 11La and 11Ra are engaged with each other. Since the eyepiece optical axes EL and ER are decentered by a predetermined amount relative to the objective optical axes OL and OR by the left and right second type Porr prisms L3L and L3R, the interval between the optical axes EL and ER changes as the eyepiece units 9L and 9R rotate. Thereby, the interpupillary distance can be adjusted so that the distance between the eyepiece optical axes EL and ER is adjusted to the distance between the left and right eyes of the observer.

Figure 4:
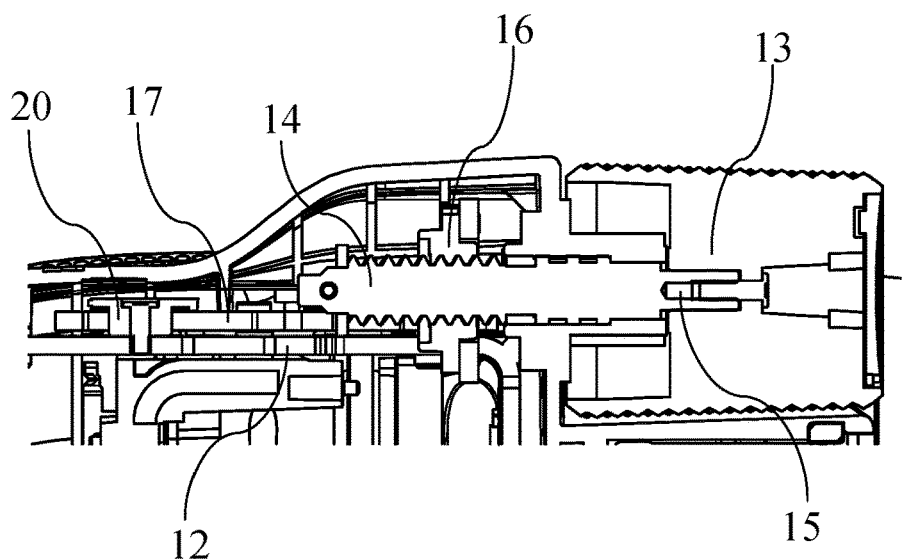
FIG. 4 is a sectional view of a focus mechanism in the binoculars.
Figure 5:
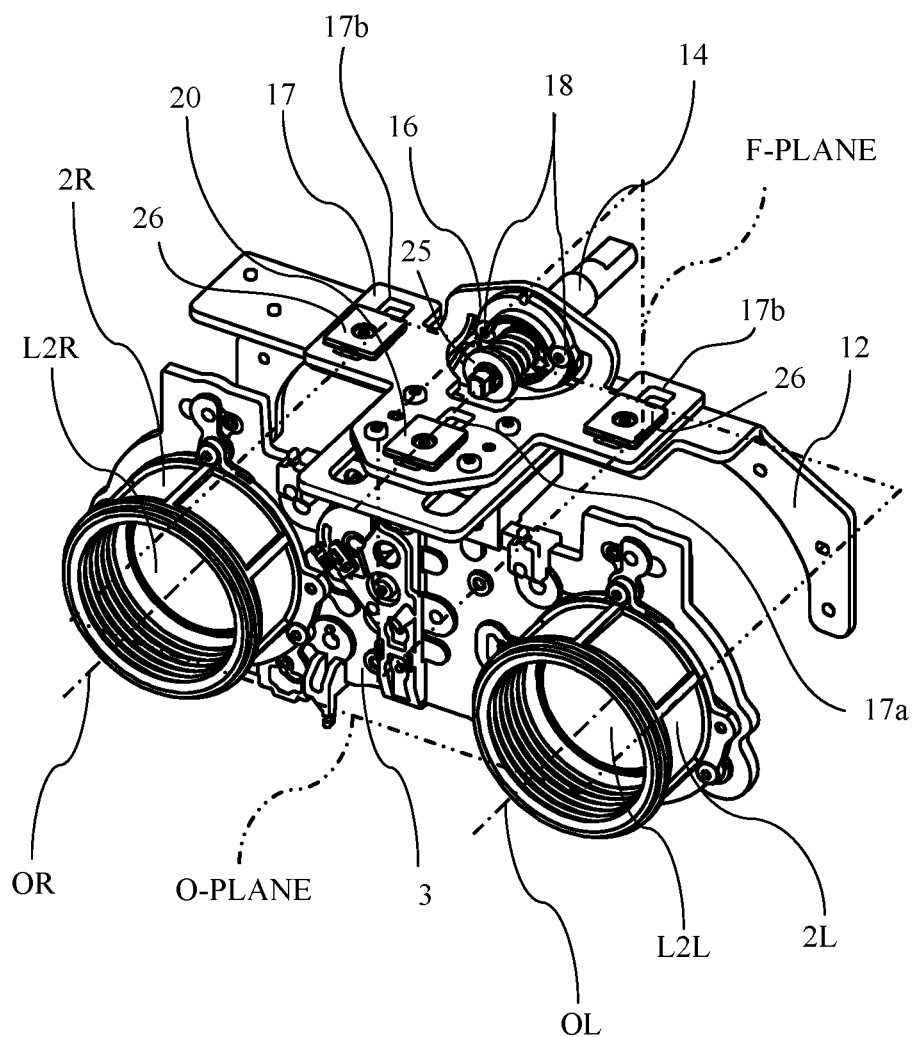
FIG. 5 is a perspective view of the focus mechanism.
Figure 6:
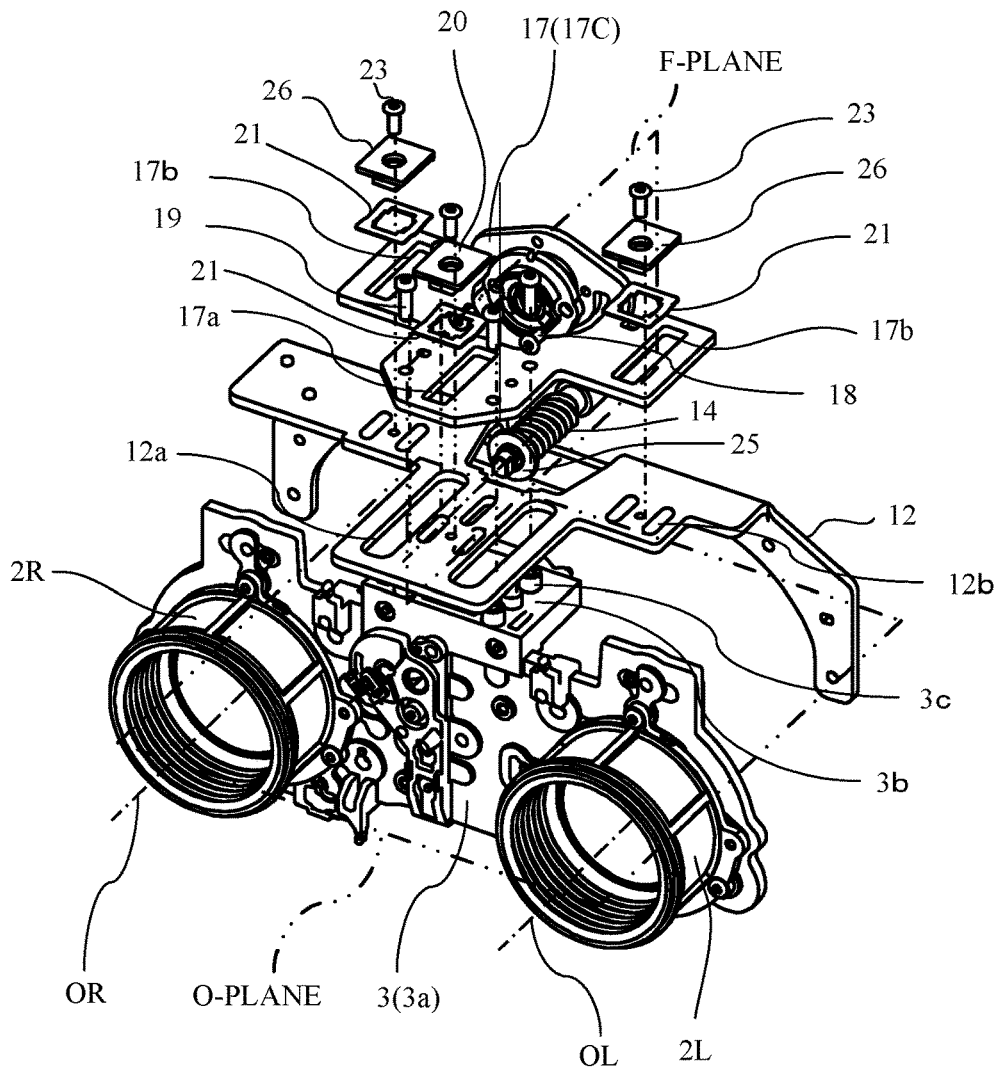
FIG. 6 is an exploded perspective view of the focus mechanism.

FIG. 4 illustrates a section of the focus mechanism taken along a line IV-IV in FIG. 3, and FIG. 5 illustrates the entire focus mechanism. FIG. 6 illustrates the exploded focus mechanism. An objective base member 12 is fixed into the body 10 by screws (not illustrated). A focus plate 17 is connected to the objective table 3 holding the objective lenses L2L and L2R via the fixed cylinders 2L and 2R as described above. The focus plate 17 and the objective table 3 are supported and guided as a movable member movable in the optical axis direction relative to the objective base member 12 by a guide mechanism described later.

A feed screw 14 as a male thread member is inserted into an opening formed in the rear end wall portion 17c of the focus plate 17 that is bent upwardly and extends in the optical axis direction. A focus operation dial 13 as a rotationally operated member is connected to the rear end of the feed screw 14 by a screw 15 so as to be integrally rotatable with the feed screw 14. The focus operation dial 13 and the feed screw 14 are prevented from moving in the optical axis direction since the body 10 is sandwiched between the focus operation dial 13 and a stopper plate 25 attached near the front end of the feed screw 14. Thereby, the focus operation dial 13 and the feed screw 14 (the male thread member) can rotate at a fixed position in the optical axis direction.

A drive nut 16 is located on the outer periphery of the feed screw 14, serves as a female thread member having a female thread portion engaged with the male thread portion of the feed screw 14, and is fixed to the focus plate 17 by screws 18. When the observer rotates the focus operation dial 13 to rotate the feed screw 14, the drive nut 16 is driven in the optical axis direction by the screw engagement action with the feed screw 14, and thereby the focus plate 17 and the objective table 3 are moved in the optical axial direction. As a result, the left and right objective lenses L2L and L2R move in the optical axis direction, and focusing is made according to the observation distance.

The objective table 3 has the objective mount surface 3a formed so as to be orthogonal to the objective optical axes OL and OR as described above, and a focus mount surface 3b parallel to the objective optical axes OL and OR above the objective mount surface 3a. Focus connecters 3c protruding upwardly are provided on both right and left sides of the focus mount surface 3b. Each focus connecter 3c is inserted into a corresponding one of long holes 12a formed on both left and right sides of the objective base member 12 so as to extend in the optical axis direction, and is connected to the focus plate 17 and a screw 19. The objective base member 12 has a sliding surface 12b parallel to the O-plane as a first plane including the objective optical axes OL and OR.

A guided groove 17a is formed at part of the focus plate 17 on the front side of the feed screw 14 in the optical axis direction or a position on or along an F-plane as a second plane including the central axis of the feed screw 14 and orthogonal to the O-plane. Guided surfaces extending in the optical axis direction along the F surface are formed on both left and right sides of the guided groove 17a sandwiching the F-plane. A guide shaft of a guide member 20 is engaged with the guided groove 17a. Guide surfaces are formed on the left and right sides of the guide shaft and line-contacts or surface-contacts the left and right guided surfaces of the guided groove 17a. The guide shaft may be press-fit in the guided groove 17a.

The guide member 20 is fixed onto the objective base member 12 by screws 22 with a leaf spring 21 as an elastic member having a rectangular frame shape sandwiched between the guide member 20 and the focus plate 17. A guide includes the guide member 20 and the guided groove 17a.

Perforation grooves 17b extending in the optical axis direction are formed at left and right rear parts of the focus plate 17, which are separated from the guided groove 17a on both sides in the lateral direction and overlap the range where the feed screw 14 is provided, in the optical axis direction. A shaft of a holding member 26 is inserted into each perforation groove 17b. There is a gap between the shaft of the holding member 26 and two surfaces on the left and right sides of the perforation groove 17b. The holding member 26 is fixed onto the objective base member 12 by screws 23 with the leaf spring 21 interposed between the holding member 26 and the focus plate 17. Thereby, the focus plate 17 is held by the objective base member 12 and the holding member 26 so as to be movable in the optical axis direction. A holder includes the holding member 26 and the perforation groove 17b.

Each leaf spring 21 generates a biasing force for pressing the focus plate 17 against the sliding surface 12b of the objective base member 12. Thereby, the focus plate 17 always slides on the sliding surface 12b during focusing.

The feed screw 14 is made of metal, and the drive nut 16 is made of resin. A thread pitch of the female thread portion of the drive nut 16 is set to be slightly smaller than a thread pitch (lead) of the male thread portion of the feed screw 14. Thereby, the male thread portion of the feed screw 14 and the female thread portion of the drive nut 16 are engaged with each other in the press-fit state. For example, the thread pitch of the drive nut 16 is 4.50 mm while the thread pitch of the feed screw 14 is 4.65 mm. Since the thread pitches of the feed screw 14 and the drive nut 16 are different from each other, the slope of the thread of the feed screw 14 and the slope of the thread of the drive nut 16 are pressed against each other. Then, the thread of the resin drive nut 16 is slightly deformed by the thread of the metal feed screw 14. Thereby, the drive nut 16 not only converts the rotation of the feed screw 14 into the movement in the optical axis direction with few plays in both the optical axis direction and the lateral direction, but also is guided by the feed screw 14 in the optical axis direction. In other words, the movements of the focus plate 17 integrated with the drive nut 16, the objective table 3, and the left and right objective lenses L2L and L2R are guided in the optical axis direction.

If the feed screw and the drive nut have the same thread pitches, the rotation of the feed screw can be converted into the movement in the optical axis direction but the drive nut cannot be guided in the optical axis direction due to some plays in the lateral direction.

On the other hand, in this embodiment, the focus plate 17, the objective table 3, and the left and right objective lenses L2L and L2R are guided in the optical axis direction by the engagement in the guide (the guide member 20 and the guided groove 17a). In other words, the focus plate 17, the objective table 3, and the left and right objective lenses L2L and L2R are guided in the optical axis direction at two positions or the position of the drive nut 16 and the position of the guide, which are spaced from each other in the optical axis direction. Thereby, the plays of the focus plate 17, the objective table 3, and the left and right objective lenses L2L and L2R can be reduced in comparison with the single guide of the drive nut 16 by the feed screw 14.

Moreover, the leaf spring 23 distant from the guide groove 17a on both sides in the lateral direction can suppress displacements of the objective optical axes OL and OR, which would occur if the focus plate 17, the objective table 3, and the left and right objective lenses L2L and L2R displace in a direction orthogonal to the optical axes OL and OR along with orientation changes of the binoculars.

Figure 7:
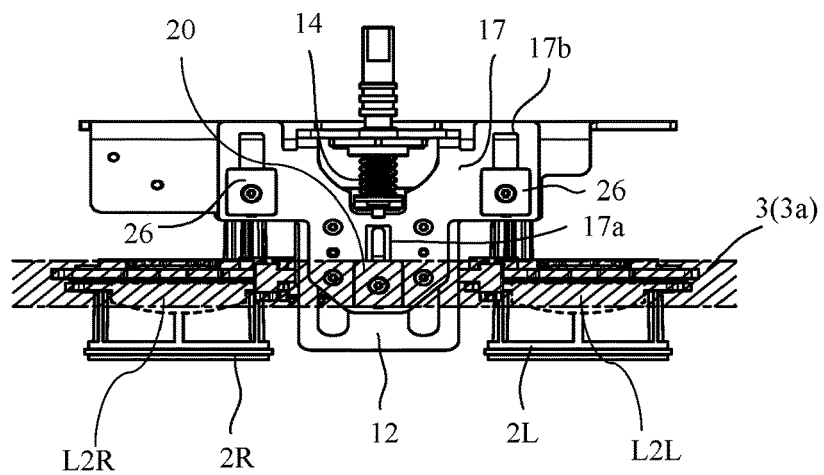
FIG. 7 is a top view of the focus mechanism.

FIG. 7 is a top view. As hatched in this figure, the guide member 20 disposed in front of the feed screw 14 is located in a range where at least its part overlaps the objective lenses L2L and L2R in the optical axis direction when viewed from the top. Thereby, the focus mechanism can be made shorter in the optical axis direction, and the length of the feed screw 14 protruding upwardly from the O-plane can be reduced in the optical axis direction.

The above structure can provide compact binoculars that can stably move the left and right objective lenses L2L and L2R in the optical axis direction.

While the guide includes the guided groove 17a and the guide member 20 in this embodiment, the guide may have another structure as long as it has a guide function in the optical axis direction. This is similarly applied to the holder including the perforation groove 17b and the holding member 26.

This embodiment disposes the leaf springs 21 in the guide (17a, 20) and the holder (17b, 23), but may dispose it in another location.

This embodiment has discussed a single guide provided at a single position in front of the feed screw 14 in the optical axis direction. Alternatively, two or more guides may be disposed side by side in the lateral direction at that location. For example, two guides may be provided along (or sandwich) the F-plane at the same location in the optical axis direction.

The above embodiment can realize a compact optical apparatus that can stably guide the movable member holding the pair of lenses in the optical axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-099349, filed on May 28, 2019, which is hereby incorporated by reference herein in its entirety.

What is claimed is:

1. An optical apparatus having a pair of lenses spaced from each other in a first direction and movable in a second direction orthogonal to the first direction, the optical apparatus comprising:
 a base member;
 a first thread member rotatable at a fixed position in the second direction;
 a rotationally operated member rotationally operated by a user and configured to rotate the first thread member;
 a second thread member engaged with the first thread member and configured to move in the second direction relative to the base member as the first thread member is rotated;
 a movable member configured to hold the pair of lenses and to move in the second direction together with the second thread member; and a guide configured to guide a movement of the movable member in the second direction relative to the base member, wherein optical axes of the pair of lenses are included in a first plane, and the guide is located at a position on a second plane that is orthogonal to the first plane, the second plane including a central axis of the first thread member.

2. The optical apparatus according to claim 1, wherein the first thread member and the second thread member have thread pitches different from each other, and thereby guide the movement of the movable member in the second direction.

3. The optical apparatus according to claim 1, wherein the guide is provided at one position on an object side further than the first thread member in the second direction.

4. The optical apparatus according to claim 1, wherein when viewed from a direction orthogonal to the first plane, at least part of the guide is located in a range overlapping the pair of lenses in the second direction.

5. The optical apparatus according to claim 1, wherein the first thread member is made of metal, and the second thread member is made of resin.

6. The optical apparatus according to claim 1, further comprising a holder located at a position apart from the guide in the first direction and configured to hold the movable member on the base member movable in the second direction.

7. The optical apparatus according to claim 6, further comprising an elastic member configured to generate a biasing force for pressing the movable member against the base member, wherein the elastic member is held by the holder.

8. The optical apparatus according to claim 1, wherein the first thread member and second thread member engage with each other in a state of guiding the movement of the movable member in the second direction.

* * * * *